US007752566B1

(12) United States Patent
Nelson

(10) Patent No.: US 7,752,566 B1
(45) Date of Patent: Jul. 6, 2010

(54) TRANSPARENT OVERLAYS FOR PREDICTIVE INTERFACE DRAG AND DROP

(75) Inventor: John G. Nelson, Normandy Park, WA (US)

(73) Assignee: Adobe Systems Incorporated, San Jose, CA (US)

( * ) Notice: Subject to any disclaimer, the term of this patent is extended or adjusted under 35 U.S.C. 154(b) by 641 days.

(21) Appl. No.: 11/261,865

(22) Filed: Oct. 28, 2005

(51) Int. Cl.
*G06F 3/048* (2006.01)
(52) U.S. Cl. .................. 715/769; 715/768; 715/770
(58) Field of Classification Search .............. 715/768, 715/769, 770, 853
See application file for complete search history.

(56) References Cited

U.S. PATENT DOCUMENTS

| 5,598,524 | A | * | 1/1997 | Johnston et al. ............ 715/769 |
| 5,611,060 | A | * | 3/1997 | Belfiore et al. ............. 715/819 |
| 6,008,809 | A | * | 12/1999 | Brooks ...................... 715/792 |
| 6,246,411 | B1 | * | 6/2001 | Strauss ...................... 715/863 |
| 6,356,281 | B1 | * | 3/2002 | Isenman .................... 345/629 |
| 6,628,309 | B1 | * | 9/2003 | Dodson et al. ............. 715/769 |
| 7,216,302 | B2 | * | 5/2007 | Rodden et al. ............. 715/815 |
| 2003/0107601 | A1 | * | 6/2003 | Ryzhov ..................... 345/769 |
| 2003/0184587 | A1 | * | 10/2003 | Ording et al. .............. 345/769 |
| 2003/0222915 | A1 | * | 12/2003 | Marion et al. .............. 345/769 |
| 2004/0001094 | A1 | * | 1/2004 | Unnewehr et al. ......... 345/769 |
| 2004/0179017 | A1 | * | 9/2004 | Martyn et al. .............. 345/536 |
| 2006/0212790 | A1 | * | 9/2006 | Perantatos et al. ........ 715/501.1 |
| 2007/0016872 | A1 | * | 1/2007 | Cummins et al. .......... 715/769 |
| 2007/0288860 | A1 | * | 12/2007 | Ording et al. .............. 715/779 |

* cited by examiner

*Primary Examiner*—Weilun Lo
*Assistant Examiner*—Tuyetlien T Tran
(74) *Attorney, Agent, or Firm*—Robert C Kowert; Meyertons, Hood, Kivlin, Kowert & Goetzel, P.C.

(57) ABSTRACT

Briefly, in accordance with one or more embodiments, a transparent overlay of available dropzones may be displayed to assist a user in determining a new configuration for a document utilizing drag and drop.

44 Claims, 4 Drawing Sheets

TRANSPARENT OVERLAYS FOR PREDICTIVE INTERFACE DRAG AND DROP

BACKGROUND

Drag and drop applications may be very useful to a user as these types of applications may allow a user to move data easily and graphically. Drag and drop can be used to invoke many kinds of actions, or create various types of associations between two abstract objects. Difficulty sometimes occurs when a user drags and drops object, then is not satisfied with the new configuration and may have to drag and drop again and again.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
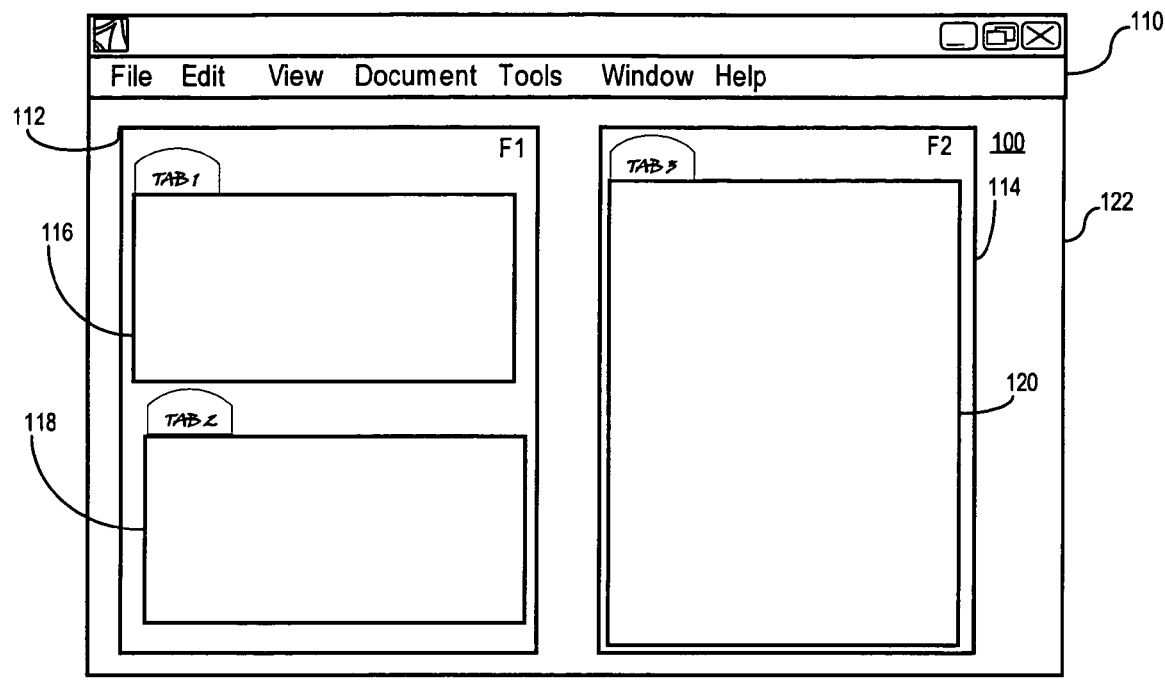
FIG. 1 is a diagram of a file illustrating a program, objects, and tabs in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of processes, programs and/or symbolic representations of operations on data bits and/or binary digital signals within a computer memory, for example. These algorithmic descriptions and/or representations may include techniques used in the data processing arts to convey the arrangement of a computer system and/or other information handling system to operate according to such programs, processes, and/or symbolic representations of operations.

A process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computing platform such as computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include one or more apparatuses for performing the operations herein. Such an apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device, computing platform, and/or other information handling system.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In one or more embodiments, an object may refer to an item that may be selected and/or manipulated, for example shapes, pictures, images, text, and/or text boxes that may appear on a display as rendered by a computing platform coupled to the display. In one or more embodiments, the term render may refer to displaying an object on a display coupled to a computing platform, and/or to manipulating the object on the display. In one or more embodiments, graphic may refer to a pictorial and/or image representation of an object, and in one or more alternative embodiments may refer to an object itself. In one or more embodiments, a graphic element may be single and/or fundamental graphic object, and/or a portion thereof. In one or more embodiments, a letterform may be a shape and/or design of a letter of an alphabet. In one or more embodiments, a font may refer to a design for a set of characters and/or letters for printing and/or displaying.

In one or more embodiments, text may refer to letters and/or characters that may be manipulated and/or combined as words, lines, and/or pages. However, these are merely example definitions of the above terms, phrases, and/or concepts wherein other definitions may apply as well, and the scope of claimed subject matter is not limited in these respects. In one or more embodiments, to parse may refer to dividing computer code into elements that can be analyzed and/or identified. In one or more embodiments, file may refer to a collection of data, code, instructions, and/or other information that may be readable, accessible, and/or able to be acted on by a computing platform and/or the like.

In one or more embodiments, a format may refer to a predefined organizational structure for data, code, instructions, and/or other information that may be readable, accessible, and/or able to be acted on by a computing platform and/or the like. In one or more embodiments, a graphical user interface (GUI) may refer to a program interface that utilizes displayed graphical information to allow a user to control and/or operate a computing platform and/or the like. A pointer may refer to a cursor and/or other symbol that appears on a display screen that may be moved and/or controlled with a pointing device to select objects, and/or input commands via a graphical user interface of a computing platform and/or the like. A pointing device may refer to a device used to control a cursor, to select objects, and/or input commands via a graphical user interface of a computing platform and/or the like. Pointing devices may include, for example, a mouse, a trackball, a track pad, a track stick, a keyboard, a stylus, a digitizing tablet, and/or similar types of devices. A cursor may refer to a symbol and/or a pointer where an input selection and/or actuation may be made with respect to a region of in a graphical user interface. In one embodiment, content reflow may refer to where the contents of a document may be rearranged to alter the layout, order, and/or readability of the content of the document. In one or more embodiment, transient may refer to being in a state for a brief and/or temporary period of time, and/or passing with time and/or a temporary state of being. However, these are merely example definitions of terms relating to graphical user interfaces and/or computing platforms and/or the like, and the scope of claimed subject matter is not limited in this respect.

Referring now to FIG. 1, a diagram of a file including one or more objects and associated text content in accordance with one or more embodiments will be discussed. As shown in FIG. 1, file 100 may comprise a document displayed in and/or controlled by program 110. In one embodiment, program 110 may comprise an Adobe® Acrobat® type program available from Adobe Systems Incorporated of San Jose, Calif., USA, and file 100 may comprise an Adobe® Portable Document Format (PDF) type file, although the scope of claimed subject matter is not limited in these respects. In one embodiment, document 100 may be authored and/or created in a page description language (PDL), which refers to a language for describing a layout and/or contents of a page to be displayed and/or printed. Such a page description language may comprise, for example, Adobe® PostScript® available from Adobe Systems Incorporated. PostScript®, for example, describes a page in terms of page objects including textual objects and/or graphical objects such as lines, arcs, and/or circles. PostScript® may be used, for example, to create Portable Document Format type files, although the scope of claimed subject matter is not limited in this respect. In another embodiment, program 110 may be a word processor and/or a text processor, for example Microsoft® Word available from Microsoft Corporation of Redmond, Wash., USA, and file 100 may be a Microsoft® Word type file, although the scope of claimed subject matter is not limited in this respect. In yet another embodiment, program 110 may comprise a web browser to open and/or display web pages, and file 100 may comprise a Hyper Text Markup Language (HTML) type file. In such an embodiment, program 110 may comprise, for example, a Microsoft® Internet Explorer web browser available from Microsoft Corporation, or alternatively may be, for example, a Firefox web browser available from the Mozilla Foundation of Mountain View, Calif., USA, although the scope of claimed subject matter is not limited in this respect. Program 110 and file 100 may be of many other types and formats. This disclosure is not limited with respect to the program or file. Program 110 and file 100 may be displayed via window 122.

In one embodiment, file 100 may include, for example, a frame (F1) 112 and a second frame (F2) 114. A frame may include a tab and/or object. In this embodiment frame 1 112 may include 2 tabs TAB 1 116 and TAB 2 118. TAB 1 and TAB 2 are shown as one above the other. Other configurations may be utilized, such as but not limited to, side by side, among many others. A frame may contain many tabs, in many different configurations. In one or more embodiments, TAB 1 116 and/or TAB 2 118 may comprise objects such as text and/or text boxes that contain text, although the scope of claimed subject matter is not limited in this respect. A first object, such as frame 1 112, may be displayed adjacent to second frame 114. There may be many different locations and/or configurations for frames. In one or more embodiments, where a first object is in a context relationship with another object, the first object generally may be disposed adjacent to and/or proximate to, and/or intended by an author to be disposed adjacent to and/or proximate to, the other object in a given layout of a file and/or document, although the scope of claimed subject matter is not limited in this respect.

Frame 2 114, in this embodiment may include one tab TAB 3 120. As shown TAB 3 120 may cover nearly the entire viewable are of frame 2 114. Similarly TAB 1 116 and TAB 2 118 may together cover nearly the entire viewable area of frame 1 112.

A user may want to move a tab from one frame to another. To accomplish this task, a drag and drop-type procedure may be utilized. A tab may be selected by positioning a pointer over the tab and holding down a mouse button. Many other methods for selecting a tab may be utilized without straying from the concepts disclosed herein. Once the tab has been selected, the tab may be moved by a user by moving the pointer while holding in the mouse button. This may be commonly known as the drag portion of drag and drop. In this embodiment, in FIG. 2, TAB 2 118 may have been selected and moved a predetermined distance. The predetermined distance may be a number of pixels, such as but not limited to 15 pixels. Many, many other distances may be utilized without straying from the concepts disclosed herein.

Figure 2:
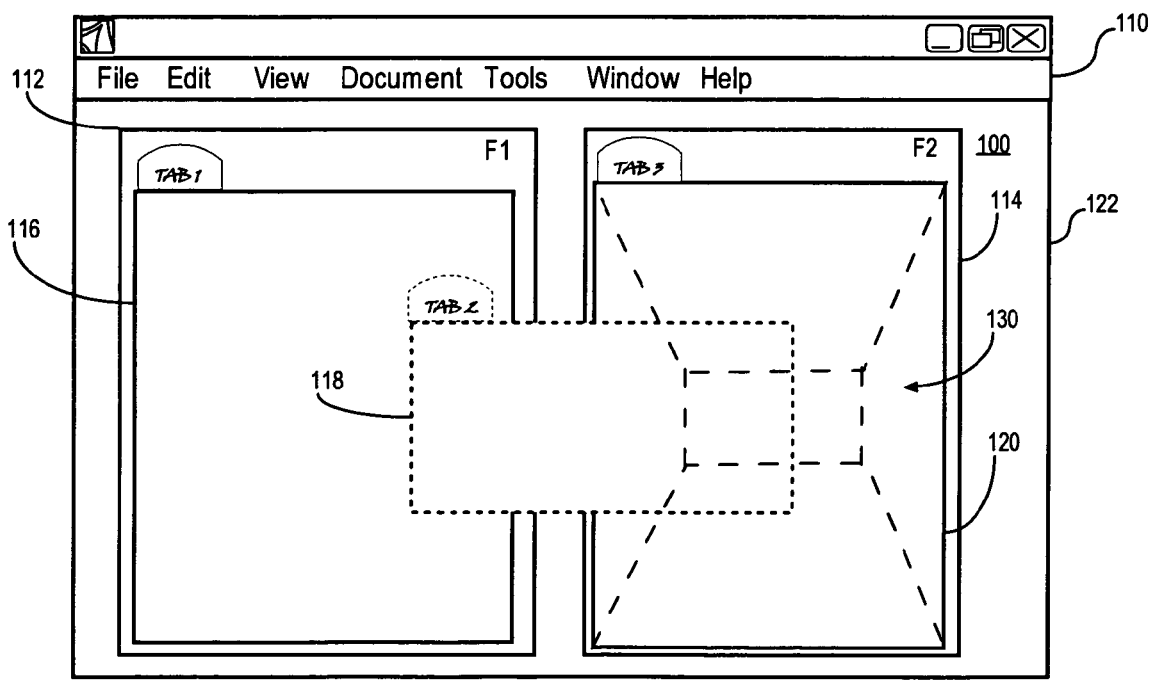
FIG. 2 is a diagram of a file illustrating transparent overlays and placement in accordance with one or more embodiments.

Once the selected tab is moved a predetermined distance, the selected tab may be displayed as a "floating window" having a position controlled by the pointer. A floating window may be one whose position is changeable and controlled by a pointer. It may cease to be a floating window when it is deselected, or other indication, as desired. In FIG. 2 the dashed lines of TAB 2 118 indicate it is a floating window. In this embodiment, once TAB 2 118 has been displayed as a floating window, existing TAB 1 116, which was previously adjacent TAB 2 118, within frame 1 112, may be resized to indicate what the frame will look like if the user inserts TAB 2 118 in another frame and/or window.

Frame 1 112 may be considered the originating frame as the tab that may be dragged and dropped may have originated from frame 1 112. Similarly, frame 2 114 may be considered the target frame if the selected tab is to be inserted in frame 2 114. Tab 2 118 may have an original position as shown in FIG. 1. The original position may be the position of a tab before a drag and drop process is initiated.

Once TAB 2 118 is moved over a frame with available dropzones, an overlay 130 may be displayed. Overlay 130 may indicate the available dropzones where TAB 2 118 may be inserted. Overlay 130 may be transparent, such that the user may view the frames, tabs, and/or other objects and/or windows while seeing the overlay of the dropzones in place. A dropzone may be an area of a window, frame, and/or other object that a tab and/or object may be inserted into. There may be various areas available. The areas available may depend upon the type and/or number of windows, frames, and or objects, among other considerations. Although not shown, if TAB 2 118 was moved back over frame 1 112, available dropzones may appear within frame 1 112. As TAB2 118 is moved over various frames, the different available dropzones may appear.

Figure 3:
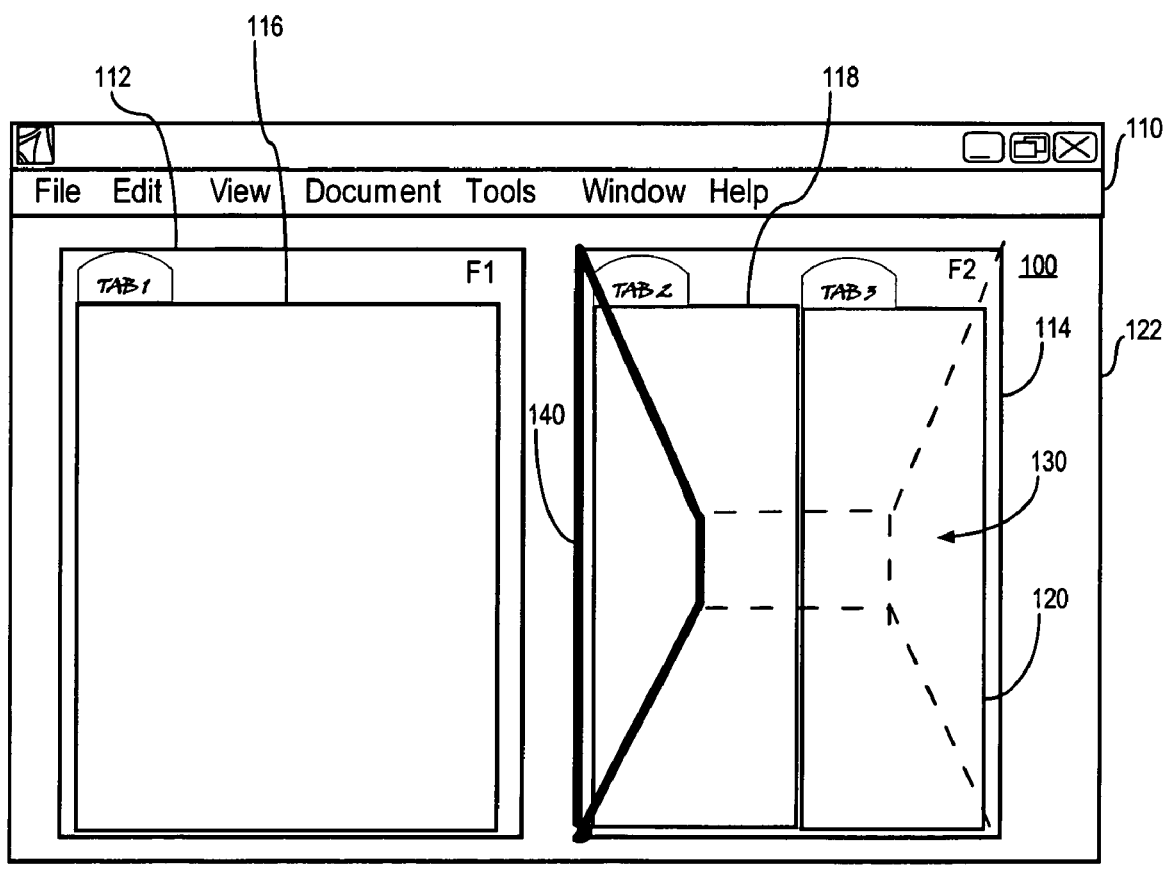
FIG. 3 is a diagram of a file illustrating transparent overlays and placement in accordance with one or more embodiments.

As shown in FIG. 3, the current and/or specified dropzone 140 that TAB 2 118 is located may be highlighted for the user to assist the user in determining an acceptable insertion dropzone. Furthermore, once TAB 1 118 has been hovering over an available dropzone for a predetermined amount of time, TAB 2 118 may be inserted into the available dropzone, which may be considered the inserted dropzone. Once TAB 2 118 has been inserted into the dropzone, other tabs in the frames, in this embodiment TAB 3 120 in frame 2 114 and/or adjacent the inserted dropzone, may be resized and/or repositioned, indicating to the user what the new configuration will look like if TAB 2 118 is inserted in the dropzone. Overlay 130 may also still be displayed to the user to indicate available dropzones. Furthermore, current dropzone 140 may also be displayed to indicate to the user which dropzone TAB 2 118 is located. Although current dropzone 140 is shown as having highlighted border for indication, other indicators may be utilized, such as but not limited to a dashed border, or the entire dropzone, and/or portion of the dropzone being grayed out, and/or shaded.

In one or more embodiments, the predetermined time period may be, for example, two seconds, however, many other time periods may be utilized without straying from the concepts disclosed herein. By displaying a transparent overlay of one or more dropzones, a user may be able to identify where the object may be inserted. Furthermore, by preliminarily inserting the object, while maintaining the overlay, indicating which dropzone the object is in, a user may be able to visualize what the inserted object will look like, along with the other objects affected by the move. In one or more embodiments, the amount of dragging and dropping involved to accomplish moving an object by a user may be reduced.

In an embodiment a tab 118 may be selected by placing a pointer over the tab and holding down a mouse button, and once the selected tab has been moved a predetermined distance, the selected tab may be displayed as a floating window 118. Once the selected tab 118 has been displayed as a floating window, the tabs 116 (if any) from the frame 112 and/or window that the tab originated from may be resized to show their relative new positions. If the selected tab 118 is moved over a frame 114, object and/or window with available dropzones, a transparent overlay 130 may be displayed to indicate to the user where the selected tab may be inserted. Furthermore, the particular dropzone 140 that the selected tab is hovering over may be highlighted, such that the user may better determine where to insert the tab 118. If the selected tab 118 has hovered over a particular dropzone 140 for a predetermined amount of time, the selected tab 118 may be automatically inserted into that dropzone 140. The other tabs 120 (if any) within the frame and/or window may then be resized to show the user what the new configuration may look like. Furthermore, the transparent overlay 130 may be maintained to allow the user to see which dropzone 140 the selected tab 118 is current in. This may eliminate the need to the user to repeatedly drag and drop tabs to see what the new configuration may look like.

The user may then move the currently inserted tab 118 to another dropzone to better visualize another new configuration while still be able to see the available dropzones 130 and the dropzone 140 the selected tab is currently in. Once the inserted tab 118 is moved again, the tabs residing in the frame and/or window that the tab has left may be resized accordingly. Once the user finds a satisfactory dropzone for the tab, the tab may be deselected, such as but not limited to, by deactivation of a mouse button. With this system and method, a user may move a tab around to various locations, see what the new configuration may look like, and see the available and current dropzone before permanently inserting a tab in a new location.

Figure 4:
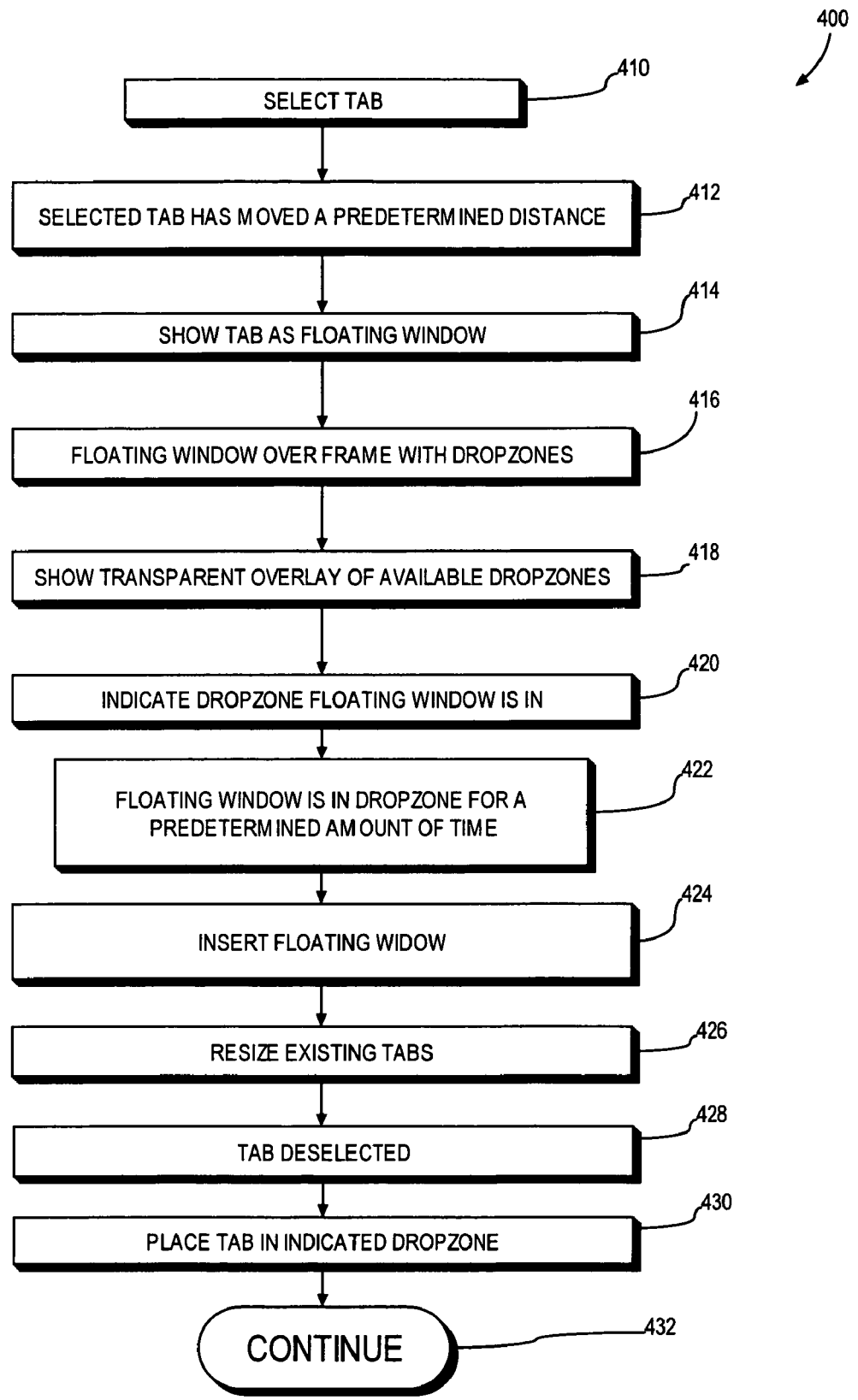
FIG. 4 is a flow diagram of a process for transparent overlay dropzones for predictive drag and drop in accordance with one or more embodiments.

Referring now to FIG. 4, a flow diagram of a process for overlay for predictive drag and drop in accordance with one or more embodiments will be discussed. In one or more embodiments, process 400 may include blocks 410 through 432, more blocks and/or fewer blocks than shown in FIG. 4. Furthermore, the order of blocks 410 through 432 is merely one order of blocks, wherein process 400 may include one or more alternative orders of blocks 410 through 432, and the scope of claimed subject matter is not limited in this respect.

A tab may be selected at block 410. The tab may be selected in many different manners. In one embodiment, tab may be selected by positioning a pointer on the tab and holding down a mouse button. At 412 a determination may be made as to the position of the selected tab. If the tab has moved a predetermined distance, then the tab is shown as a floating window at 414. the tab may be moved by moving the mouse while holding down a mouse button. However, many different processes may be utilized for selecting and moving a tab, object, and/or frame without straying from the concepts disclosed herein.

At 416 a determination may be made if the floating window is over a frame with available dropzones. If the floating window is over a frame with available dropzone, an over lay may be shown 418 indicating the available dropzones within the frame the floating window is hovering over. At 420 the particular dropzone that the floating window is hovering over may be indicated. This may assist the user in determining an acceptable dropzone to insert the tab into, as well as the layout of the new configuration.

At 422 a determination may be made if the floating window has been within an available dropzone for a predetermined amount of time. If such a determination is made, the floating window may be inserted into that dropzone at 424. Once the tab is inserted, the adjacent tabs within the frames, both originating and target, may be resized at 426, based at least in part upon the removal and/or insertion of the tab. This may give the user an indication of what the inserted tab may look like in the frame and/or document. If the user does not like the placement, the user may move the tab again and the process may be repeated from 412 above. The user may move the floating window to a second dropzone, and the adjacent tabs from the inserted dropzone may resize.

If the user approves of the placement of the tab, the tab may be deselected at 428. Deselection may be the user releasing the mouse button. However, many other deselection methods and/or techniques may be utilized without straying from the concepts disclosed herein. Once the tab is deselected, it may be placed in the indicated dropzone at the indicated location at 430. The process then flows to continue at 432.

The resizing of objects, the displaying of dropzones, and/or the repositioning of other tabs, frames, and/or objects as described with respect to FIG. 4 and process 400 is merely an example of a method for transparent overlay for predictive drag and drop, and other alternative embodiments and/or implementations may be made. For example, first frame 112, second frame 114, first tab 116, second tab 118, and/or third tab 120 may include any type of object, including but not limited to images, movies, media, text, text boxes, graphs, patterns, charts, windows, fonts, letters, characters, symbols, links, dynamic content, buttons, menus, tools, toolbars, dialogue boxes, radio buttons, scroll bars, scroll buttons, cursors, and/or the like, and furthermore may be presented in file 100 in any combination thereof, and the scope of claimed subject matter is not limited in this respect.

Figure 5:
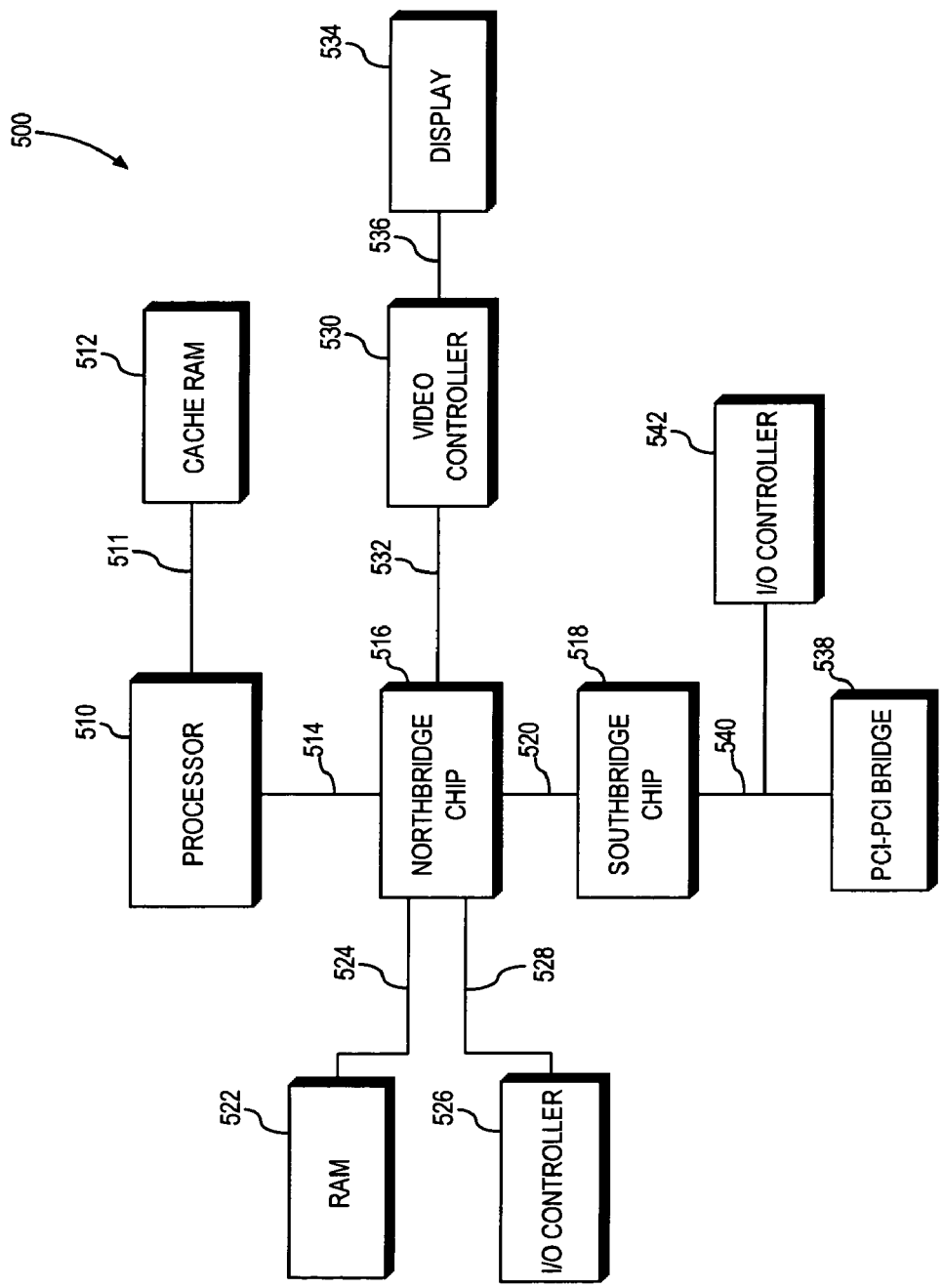
FIG. 5 is a block diagram of a computing platform capable of executing transparent overlays in accordance with one or more embodiments.

Referring now to FIG. 5, a block diagram of a computing platform capable of executing content reflow in response to an object resize event in accordance with one or more embodiments will be discussed. It should be noted that computing platform 500 of FIG. 5 is merely one type of computing platform, and other computing platforms having more and/or fewer components than shown in FIG. 5 may be implemented, and the scope of claimed subject matter is not limited in this respect. In one or more embodiments, computing platform 500 may be utilized to implement process 400 in whole and/or using more and/or fewer blocks than shown in FIG. 4, and the scope of claimed subject matter is not limited in this respect. Computing platform 500 may include processor 510 coupled to cache random access memory (RAM) 512 via back side bus 511. Processor 610 may also couple to a chipset that includes Northbridge chip 516 via front side bus 514, and also to Southbridge chip 518 via bus 520. In one embodiment, Northbridge chip 516 in general may be utilized to connect a processor to memory, to an input/output bus, to a video bus, and to Level 2 cache, although the scope of claimed subject matter is not limited in this respect.

In one embodiment, Southbridge chip 518 may be utilized to control input/output functions, the basic input/out system (BIOS), an interrupt control functions of Integrated Drive Electronics (IDE) devices such as hard disks or compact disk-read only memory (CD-ROM) devices or the like, although the scope of claimed subject matter is not limited in this respect. Random access memory (RAM) 522 may couple to Northbridge chip 516 via main memory bus 524, and input/output (I/O) controller 526 may also couple to Northbridge chip 516 via I/O bus 528. In one embodiment, I/O controller 526 and I/O bus 528 may be in compliance with a Small Computer Systems Interface (SCSI) specification such as the American National Standards Institute (ANSI) X3.131-1994 SCSI-2 specification, although the scope of claimed subject matter is not limited in this respect. In an alternative embodiment, I/O controller 526 and I/O bus 528 may be in compliance with a Peripheral Component Interconnect (PCI) bus, although the scope of claimed subject matter is not limited in this respect.

Video controller 530 may couple to Northbridge chip 516 via video bus 532 which in one embodiment may comprise an Accelerated Graphics Port (AGP) bus, although the scope of claimed subject matter is not limited in this respect. Video controller 530 may provide video signals to an optionally coupled display 534 via display interface 536 which in one embodiment may comprise a Digital Visual Interface (DVI) in compliance with a standard promulgated by the Digital Display Working Group, although the scope of claimed subject matter is not limited in this respect. Southbridge chip 518 may couple to a peripheral component interconnect to peripheral component interconnect (PCI-PCI) bridge 538 via input/output bus 540, which may in turn couple to I/O controller 542 to control various peripheral devices such as Universal Serial Bus (USB) devices, or devices compatible with an Institute of Electrical and Electronics Engineers (IEEE) 1394 specification, although the scope of claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to transparent overlays for predictive drag and drop and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:

selecting an object from an originating frame in response to signals generated by a user input device;

detecting movement of the selected object at a determined distance from a first position of the selected object in response to the signals generated by the user input device; and generating display signals to:

simultaneously indicate, on a display, two or more transparent dropzones corresponding to the selected object within a target frame in response to detection of the movement of the selected object, wherein the two or more transparent dropzones comprise at least a first dropzone and a second dropzone, the first dropzone having different dimensions from the second dropzone;

preliminarily insert the selected object into a specified dropzone indicated on the display and resize at least one object within the originating frame, while simultaneously indicating the two or more transparent dropzones, in response to the selected object being within the specified dropzone for a determined amount of time, wherein the selected object is resizable based at least in part on dimensions of the specified dropzone; and indicate which of the two or more transparent dropzones the selected object is over.

2. The method of claim 1, further comprising generating the display signals to maintain the indication of the two or more transparent dropzones.

3. The method of claim 1, further comprising generating the display signals to display removal of the selected object from the originating frame.

4. The method of claim 3, further comprising generating the display signals to display resizing of an existing object in the originating frame, based at least in part upon the selected object being removed from the originating frame.

5. The method of claim 1, further comprising generating the display signals to display the selected object as a floating window.

6. The method of claim 5, further comprising generating the display signals to display the floating window as transparent if moved over a transparent dropzone.

7. The method of claim 1, further comprising generating the display signals to display resizing of an existing object in the target frame, based at least in part upon the selected object being inserted into the target frame.

8. The method of claim 1, wherein the originating frame is the target frame.

9. The method of claim 1, further comprising deselecting the selected object in response to the signals generated by the user input device.

10. The method of claim 9, further comprising generating the display signals to display insertion of the selected object within the specified dropzone in response to deselecting the selected object.

11. The method of claim 1, further comprising generating the display signals to indicate that the selected object is within the second dropzone in response to moving the selected object to the second dropzone.

12. The method of claim 11, further comprising generating the display signals to display removing the selected object from the specified dropzone.

13. The method of claim 12, further comprising generating the display signals to display resizing an existing object from a frame of the inserted dropzone, based at least in part upon the selected object being removed from the inserted dropzone.

14. The method of claim 11, further comprising generating the display signals to display the selected object as a floating window.

15. The method of claim 11, further comprising generating the display signals to display placing the selected object into the second dropzone in response to the selected object being over the second dropzone for a predetermined amount of time.

16. The method of claim 15, further comprising generating the display signals to display resizing existing objects in a frame of the second dropzone in response to the selected object being inserted into the second dropzone.

17. An article comprising:
a storage medium comprising machine-readable instructions executable by one or more processors to:
select an object from an originating frame in response to signals generated by a user input device;
detect movement of the selected object at a determined distance from a first position of the selected object in response to the signals generated by the user input device;
generate display signals to:
simultaneously indicate, on a display, two or more transparent dropzones for the selected object within a target frame in response to detection of the movement of the selected object, wherein the two or more transparent dropzones comprise at least a first dropzone and a second dropzone, the first dropzone having different dimensions from the second dropzone;
preliminarily insert the selected object into a specified dropzone indicated on the display and resize at least one object within the originating frame, while simultaneously indicating the two or more transparent dropzones, in response to the selected object being within the specified dropzone for a determined amount of time, wherein the selected object is resizable based at least in part on dimensions of the specified dropzone; and
indicate which of the two or more transparent dropzones the selected object is over.

18. The article of claim 17, wherein said instructions are further executable by said one or more processors to generate the display signals to maintain the indication of the two or more transparent dropzones.

19. The article of claim 17, wherein said instructions are further executable by said one or more processors to generate the display signals to remove the selected object from the originating frame.

20. The article of claim 19, wherein said instructions are further executable by said one or more processors to generate the display signals to resize an existing object in the originating frame, based at least in part upon the selected object being removed from the originating frame.

21. The article of claim 17, wherein said instructions are further executable by said one or more processors to generate the display signals to display the selected object as a floating window.

22. The article of claim 21, wherein the floating window is transparent if moved over an available dropzone.

23. The article of claim 17, wherein said instructions are further executable by said one or more processors to generate the display signals to resize an existing object in the target frame, based at least in part upon the selected object being inserted into the target frame.

24. The article of claim 17, wherein the originating frame is the target frame.

25. The article of claim 17, wherein said instructions are further executable by said one or more processors to deselect the selected object in response to the signals generated by the user input device.

26. The article of claim 25, wherein said instructions are further executable by said one or more processors to responsive to deselection of the selected object, generate the display signals to insert the selected object within the specified dropzone.

27. An apparatus, comprising:
means for selecting an object from an originating frame;
means for detecting movement of the selected object at a determined distance from a first position;
means for simultaneously indicating two or more transparent dropzones for the selected object over a target frame in response to detection of the movement of the selected object, wherein the two or more transparent dropzones comprise at least a first dropzone and a second dropzone, the first dropzone having different dimensions from the second dropzone;
means for preliminarily inserting the selected object into a specified dropzone and resizing at least one object within the originating frame, while simultaneously indicating the two or more transparent dropzones in response to the selected object being over the specified dropzone for a determined amount of time, wherein the selected object is resizable based at least in part on dimensions of the specified dropzone; and means for indicating which of the two or more transparent dropzones the object is in.

28. The apparatus of claim 27, further comprising means for maintaining the indication of the two or more transparent dropzones.

29. The apparatus of claim 27, further comprising a means for displaying the object as a floating window.

30. The apparatus of claim 27, further comprising a means for resizing an existing object in the target frame.

31. The apparatus of claim 27, further comprising a means for resizing an existing object in the originating frame.

32. The apparatus of claim 27, further comprising a means for deselecting the object.

33. The apparatus of claim 32, further comprising responsive to deselecting the object, a means for inserting the object within the specified dropzone.

34. The apparatus of claim 32, further comprising responsive to inserting the object within the specified dropzone, a means for resizing existing objects in the target frame.

35. The apparatus of claim 32, further comprising responsive to inserting the object within the specified dropzone, a means for resizing existing objects in the originating frame.

36. A method, comprising:

selecting an object via a pointer from an originating frame displayed in a graphical user interface in response to signals generated by a user input device;

detecting movement of the selected object at a determined distance from a first position of the selected object in response to the signals generated by the user input device;

generating display signals to:

simultaneously indicate two or more transparent dropzones for the selected object within a target frame via the pointer in response to detection of the movement of the selected object, wherein the two or more transparent dropzones comprise at least a first dropzone and a second dropzone, the first dropzone having different dimensions from the second dropzone;

preliminarily insert the selected object into a specified dropzone and resize at least one object within the originating frame, while simultaneously indicating the two or more transparent dropzones, in response to the selected object being within the specified dropzone for a determined amount of time, wherein the selected object is resizable based at least in part on dimensions of the specified dropzone; and indicate which of the two or more transparent dropzones the selected object is over.

37. The method of claim 36, further comprising generating the display signals to maintain the indication of the two or more transparent dropzones.

38. The method of claim 36, further comprising generating the display signals to:

remove the selected object from the originating frame; and resize an existing object in the originating frame, based at least in part upon the selected object being removed from the originating frame.

39. The method of claim 36, further comprising generating the display signals to:

display the selected object as a floating window; and wherein the floating window is transparent if moved over an available dropzone.

40. The method of claim 36, further comprising generating the display signals to resize an existing object in the target frame, based at least in part upon the selected object being inserted into the target frame.

41. The method of claim 36, wherein the originating frame is the target frame.

42. The method of claim 36, further comprising, in response to the signals generated by the user input device:

deselecting the selected object; and inserting the selected object within the specified dropzone in response to deselecting the selected object.

43. The method of claim 36, further comprising generating the display signals to:

indicate the selected object is within the second dropzone in response to moving the selected object to the second dropzone;

remove the selected object from the specified dropzone; and resize an existing object from a frame of the inserted dropzone, based at least in part upon the selected object being removed from the inserted dropzone.

44. The method of claim 1, further comprising controlling a size and location of the selected object within the target frame in response to the signals generated by the user input device.

* * * * *